United States Patent
Parida et al.

(10) Patent No.: US 10,800,291 B2
(45) Date of Patent: Oct. 13, 2020

(54) ADJUSTMENT DEVICE FOR AUTOMATIC SEAT POSITION CHANGE IN A VEHICLE

(71) Applicant: Bayerische Motoren Werke Aktiengesellschaft, Munich (DE)

(72) Inventors: Sibashis Parida, Kissing (DE); Matthias Franz, Brannenburg (DE); Wolfgang Gruener, Eichenau (DE); Dietmar Weber, Paunzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 31 days.

(21) Appl. No.: 16/033,615

(22) Filed: Jul. 12, 2018

(65) Prior Publication Data
US 2019/0016235 A1    Jan. 17, 2019

(30) Foreign Application Priority Data
Jul. 12, 2017    (DE) .......................... 10 2017 211 946

(51) Int. Cl.
*B60N 2/02* (2006.01)
*B60N 2/00* (2006.01)
*B60R 16/037* (2006.01)
*B60N 2/005* (2006.01)

(52) U.S. Cl.
CPC .......... *B60N 2/0248* (2013.01); *B60N 2/002* (2013.01); *B60N 2/0252* (2013.01); *B60R 16/037* (2013.01); *B60N 2002/0055* (2013.01); *B60N 2002/0268* (2013.01)

(58) Field of Classification Search
None
See application file for complete search history.

(56) References Cited

U.S. PATENT DOCUMENTS 4,669,780 A * 6/1987 Sakakibara .......... B60N 2/0232
                                                           297/257
5,531,472 A * 7/1996 Semchena ............ G07C 5/0891
                                                           280/735

(Continued)

FOREIGN PATENT DOCUMENTS

DE          199 29 418 B4    10/2005
DE    10 2010 028 580 A1    11/2011
(Continued)

OTHER PUBLICATIONS

German-language Search Report issued in counterpart German Application No. 102017211946.2 dated Feb. 15, 2018 with partial English translation (thirteen (13) pages).

*Primary Examiner* — Jonathan M Dager
*Assistant Examiner* — Garrett F Evans
(74) *Attorney, Agent, or Firm* — Crowell & Moring LLP

(57) ABSTRACT

An adjustment device for the automatic seat position change in a vehicle from an actual setting into a predefinable target setting including an electronic control unit for automatically setting at least one actuator for adjusting at least one seat-position-dependent adjustable vehicle component depending on detected vehicle occupant data. In this case, the control unit has an analysis unit for determining an efficiency-oriented adjustment space requirement for the adjustment of the actual setting into the target setting depending on the vehicle occupant data and the vehicle interior geometry.

16 Claims, 3 Drawing Sheets

(56) References Cited

U.S. PATENT DOCUMENTS

| | | | | |
|---|---|---|---|---|
| 2008/0009958 A1* | 1/2008 | Abt | ............... | B64D 11/0643 |
| | | | | 700/29 |
| 2012/0086249 A1 | 4/2012 | Hotary et al. | | |
| 2013/0090816 A1 | 4/2013 | Huber | | |
| 2017/0285642 A1* | 10/2017 | Rander | ............. | G05D 23/1905 |
| 2018/0154799 A1* | 6/2018 | Lota | ................ | B60K 35/00 |
| 2018/0194194 A1* | 7/2018 | Lyubich | ............ | B60H 1/00285 |

FOREIGN PATENT DOCUMENTS

| | | |
|---|---|---|
| DE | 10 2011 084 087 A1 | 4/2013 |
| DE | 10 2013 212 765 A1 | 12/2014 |
| DE | 10 2014 014 699 A1 | 4/2016 |
| WO | WO 2014/023644 A1 | 2/2014 |

\* cited by examiner

ADJUSTMENT DEVICE FOR AUTOMATIC SEAT POSITION CHANGE IN A VEHICLE

CROSS REFERENCE TO RELATED APPLICATION

This application claims priority under 35 U.S.C. § 119 from German Patent Application No. 10 2017 211 946.2, filed Jul. 12, 2017, the entire disclosure of which is herein expressly incorporated by reference.

BACKGROUND AND SUMMARY OF THE INVENTION

The invention relates to an adjustment device for automatic seat position change in a vehicle. Such adjustment devices are known, for example from DE 199 29 418 B4, DE 10 2011 084 087 A1, DE 10 2010 028 580 A1, WO 2014/023644 A1, and DE 10 2013 212 765 A1.

These known adjustment devices have, for example for the ergonomic setting of a vehicle seat comprising multiple adjustable seat components and/or for the ergonomic setting of seat-position-dependent adjustable vehicle components (for example inside and/or outside mirrors or steering wheel adjustment device), a control unit for automatically setting at least one selection of the adjustable components depending on vehicle occupant data. The control unit can contain a memory, in which vehicle occupant data (individual anthropometry of the person) can be stored without the aid of vehicle-internal sensors, which data are necessary for the automatic setting of adjustable components. A selection or all adjustable components can be automatically set as needed depending on these vehicle occupant data. The automatic setting can be triggered, for example by actuating a single operating element provided for this purpose or without actuating an operating element in the case of automatic identification, for example via an individual radio key. The data of multiple vehicle occupants can preferably be input and can be selected via a single operating element, for example a button, a press/turn knob, or via an individual radio key.

Algorithms or empirically ascertained characteristic map data are provided in the adjustment device and/or in the control unit, by means of which the ergonomically optimal settings of the components are computed from the vehicle occupant data. The actuators necessary for setting the respective components are subsequently activated via the control unit depending on the computation results.

Furthermore, an input unit is provided in the vehicle, via which the required vehicle occupant data can be input from a data carrier into the memory of the control unit. Such a data carrier for storing driver and/or occupant data is preferably a mobile terminal, which additionally has an input unit, via which the defined positioning of limbs is enabled via displaceable marking bars on an image which at least schematically illustrates the vehicle occupant. This mobile terminal is connectable to the electronic control unit of the adjustment device.

It is an object of the invention to further improve an adjustment device of the type mentioned at the outset with respect to an ergonomic setting of adjustable components, while simultaneously reducing the setting effort.

This and other objects are achieved by an adjustment device for automatic seat position change in a vehicle from an actual setting into a predefinable target setting having an electronic control unit for automatically setting at least one actuator for adjusting at least one seat-position-dependent adjustable vehicle component (for example an adjustable, in particular rotatable, entire seat or an adjustable seat component itself, steering wheel, or adjustable seat component of a neighboring seat, adjustable working means, etc.) depending on detected vehicle occupant data (at least according to a percentile association). In this case, according to the invention the control unit comprises an analysis unit for determining an efficiency-oriented adjustment space requirement for the adjustment of the actual setting into the target setting depending on the vehicle occupant data and the vehicle interior geometry, in particular the seat geometry, the steering wheel geometry, and/or the fixed interior boundaries.

The analysis unit for determining the efficiency-oriented adjustment space requirement is preferably designed such that the most effective kinematic course of the seat-position-dependent adjustable vehicle components in relation to the adjustment duration and/or the power consumption, in particular of the at least one actuator, for the adjustment of the actual position into the target position is determinable thereby depending on the vehicle occupant data and the vehicle interior geometry.

In one preferred embodiment of the invention, the analysis unit is designed such that an overall silhouette (as it were a "footprint") consisting of a seat occupied by a vehicle occupant (seat silhouette overlaid by the silhouette of a person) can be computed with respect to the vehicle occupant data and the seat-position-dependent adjustable vehicle components (for example entire seat, seat surface, backrest).

The analysis unit can contain a priority rule with respect to the activatable actuators, which describes which adjustments or which actuators are preferably to be activated in which sequence.

A first preferred adjustable vehicle component is the entire seat, by which an entire seat rotation is executable for adjustment from the actual setting into the target setting, if sufficient adjustment space is available for this first adjustment. This adjustment is advantageous in particular in autonomous driving operation, if a vehicle occupant, in particular the driver, is to be moved from a driving position into a rest position oriented toward the backseat.

If an entire seat rotation is not already possible first, a first preferred vehicle component adjustment can be the backrest adjustment and/or a second preferred vehicle component adjustment can be the seat inclination adjustment in such a manner that subsequently an entire seat rotation is executable if needed. The adjustment space requirement is therefore efficiently reduced.

Furthermore, possibly in lower-priority or also higher-priority sequence, a seat depth adjustment, a seat height adjustment, a seat length adjustment, and/or a seat transverse adjustment can also be executable. This can also include the adjustment of neighboring seats or of the steering wheel.

In one preferred embodiment, at most two of the actuators are adjustable simultaneously with respect to an electrical power consumption minimization.

The efficiency-oriented adjustment space requirement can also correspond to a minimal adjustment space requirement.

The invention is based on the following considerations.

Vehicle seats are electrically adjustable. Furthermore, seats having an automatic preset are available (memory position).

It is possible to store a characteristic map, for example to avoid bottlenecks and component collisions, in an adjustment unit for electrical seats. The seats are typically only adjusted at the wish of the vehicle occupants.

It is proposed according to the invention that before the seat setting, an efficiency-oriented adjustment space requirement analysis ("quick space analysis test", QSA) is carried out. In this case the individual anthropometry of the person is considered (which has been previously measured and/or can be stored by a data set, for example) and the most effective seat kinematic adjustment sequence is computed and started based thereon. In this case, the individual anthropometry can also be classified for simplification, in particular associated with a defined person percentile (for example "5% woman" and "95% man").

This optimization is suitable for conventional and particularly preferably also for at least partially autonomously driving vehicles.

The goals in this case are:
effective setting in a short time,
effective setting with low power consumption,
maximum space saving in the vehicle,
maximum comfort by perfect anthropometric setting,
greatest possible space available for the rear passengers and/or front passenger,
enabling effective reconfiguration of the seats, in particular for vehicles in the autonomous driving mode.

In this case, an input unit, for example in the form of a known standard interface, is preferably provided, via which the required vehicle occupant data (individual anthropometry of the person) can be input from a vehicle-external or mobile data carrier into the memory of the control unit. The data carrier preferably receives the required vehicle occupant data in the form of a defined two-dimensional image from a digital image detection system. The control unit or the data carrier is provided with an algorithm, which ascertains the proportions of predefined body parts in relation to one another, in particular from the two-dimensional image, such that a specific, at least relative automatic setting of the seat and/or vehicle components can be derived therefrom. The data carrier is preferably a mobile terminal (for example mobile telephone or smart phone), which is connectable to the control unit.

The defined two-dimensional image is to be recorded in such a manner that specific body parts are recognizable and are detectable at least in the relative size thereof in relation to one another.

The required vehicle occupant data (for example the individual anthropometry of the person and/or at least a percentile association) can also be measured, however, via an input unit to be operated manually by an operator and/or via vehicle-internal cameras.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
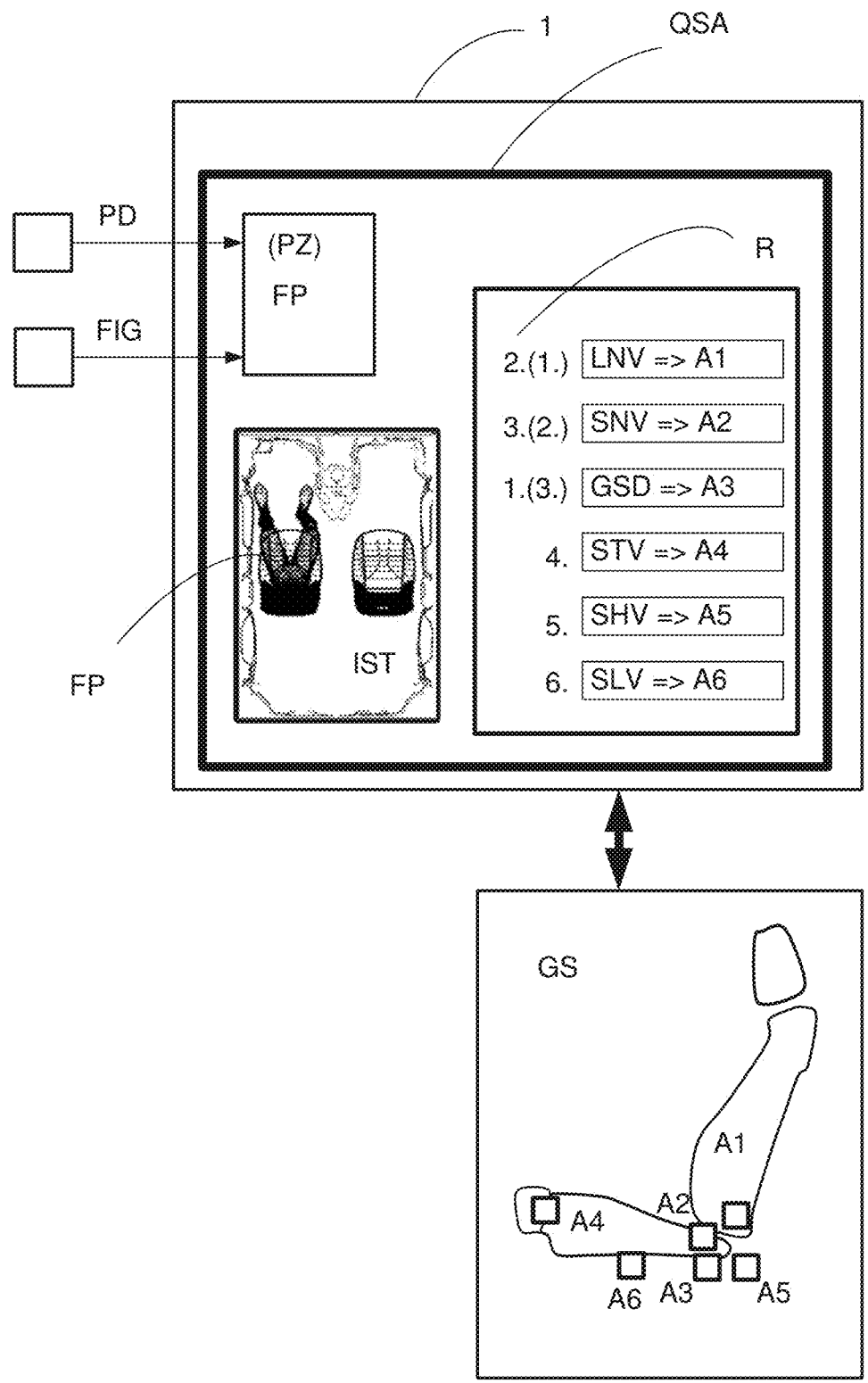
FIG. 1 schematically shows a rough overview of an adjustment device according to an embodiment of the invention.

FIG. 1 schematically illustrates the components of an adjustment device according to the invention for automatic seat position change in a vehicle from an actual setting IST into a predefinable target setting SOLL comprising an electronic control unit 1 for automatically setting at least one actuator A1, A2, A3, A4, A5, A6 for adjusting at least one seat-position-dependent adjustable vehicle component, for example the entire seat GS, depending on detected vehicle occupant data PD. In this case, the control unit 1 has an analysis unit QSA for determining an efficiency-oriented adjustment space requirement for the adjustment of the actual setting IST into the target setting SOLL (see also FIG. 3) depending on the vehicle occupant data PD and the vehicle interior geometry FIG.

The analysis unit QSA for determining the efficiency-oriented adjustment space requirement is designed, in particular programmed, such that the most effective kinematic course of the seat-position-dependent adjustable vehicle components with respect to the adjustment duration and/or the power consumption of at least one of the actuators A1, A2, A3, A4, A5, A6 for the adjustment of the actual setting IST into the target setting SOLL can be determined thereby depending on the vehicle occupant data PD and the vehicle interior geometry FIG.

Figure 3:
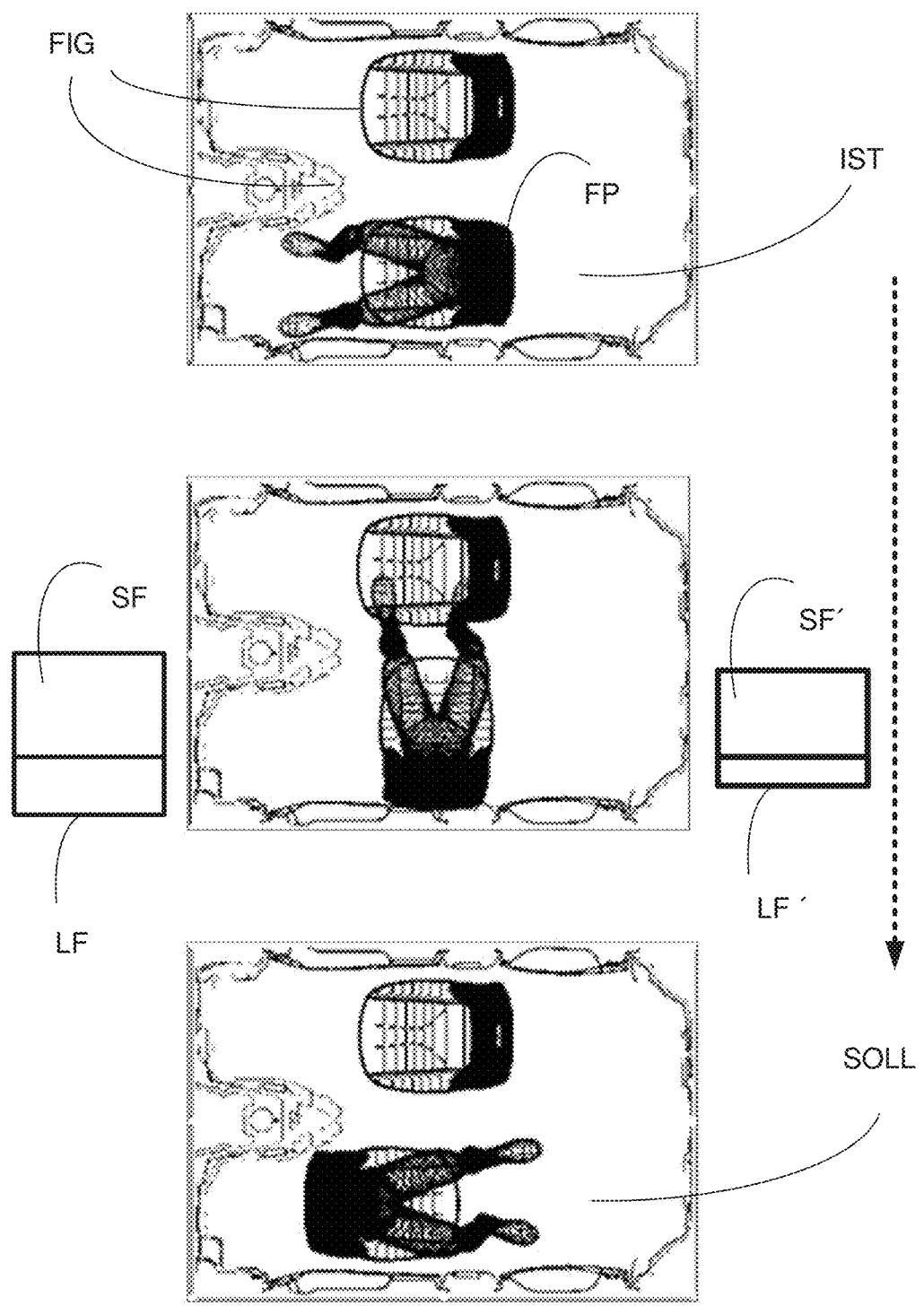
FIG. 3 shows a silhouette illustration of an actual, an intermediate, and a target seat position for the determination of an adjustment space requirement and/or of a kinematic sequence.

The analysis unit QSA can furthermore be designed such that preferably an overall silhouette FP, as it were a "footprint", consisting of the seat GS and the vehicle occupant P located thereon having his corresponding vehicle occupant data PD, can be computed with respect to the vehicle occupant data PD and the seat-position-dependent adjustable vehicle components, in particular the entire seat GS, its seat surface SF, and/or its backrest LF (see also FIG. 3). The determination of the efficiency-oriented adjustment space requirement and/or the most effective kinematic course is therefore simplified. The silhouette can be determinable both two-dimensionally and also three-dimensionally. In the present exemplary embodiment, the silhouette FP is only shown two-dimensionally for simplification.

The analysis unit QSA in FIG. 1 contains a priority rule R with respect to the activatable actuators A1, A2, A3, A4, A5, A6 of the seat GS, which rule can specify, for example the following sequence for the adjustment of the actuators and/or the adjustments linked thereto.

In principle, a first preferred adjustable vehicle component is the entire seat GS, by which only an entire seat rotation GSD is executable for the adjustment from the actual setting IST into the target setting SOLL, if possible, if the adjustment space required for this purpose is available. This would be the most efficiency-oriented adjustment space, since this adjustment could be carried out most rapidly and with the least energy.

If an entire seat rotation GSD is not possible, a first preferred vehicle component adjustment is the backrest adjustment LNV and/or a second preferred vehicle component adjustment is the seat inclination adjustment SNV, in such a manner that an entire seat rotation GSD is subsequently executable if needed. In the case of a small person, a backrest adjustment LNV could be sufficient (for example at the percentile PZ "5% woman"). In the case of a large person, both a backrest adjustment LNV and also a seat inclination adjustment SNV could be necessary (for example at the percentile PZ "95% man").

Preferably, only at most two actuators are activated simultaneously, i.e. here for example firstly A1 for LNV and A2 for SNV.

Furthermore, as needed and in consideration of maximal efficiency, a seat depth adjustment STV, a seat height adjustment SHV, and/or a seat length adjustment SLV can be executable.

Figure 2:
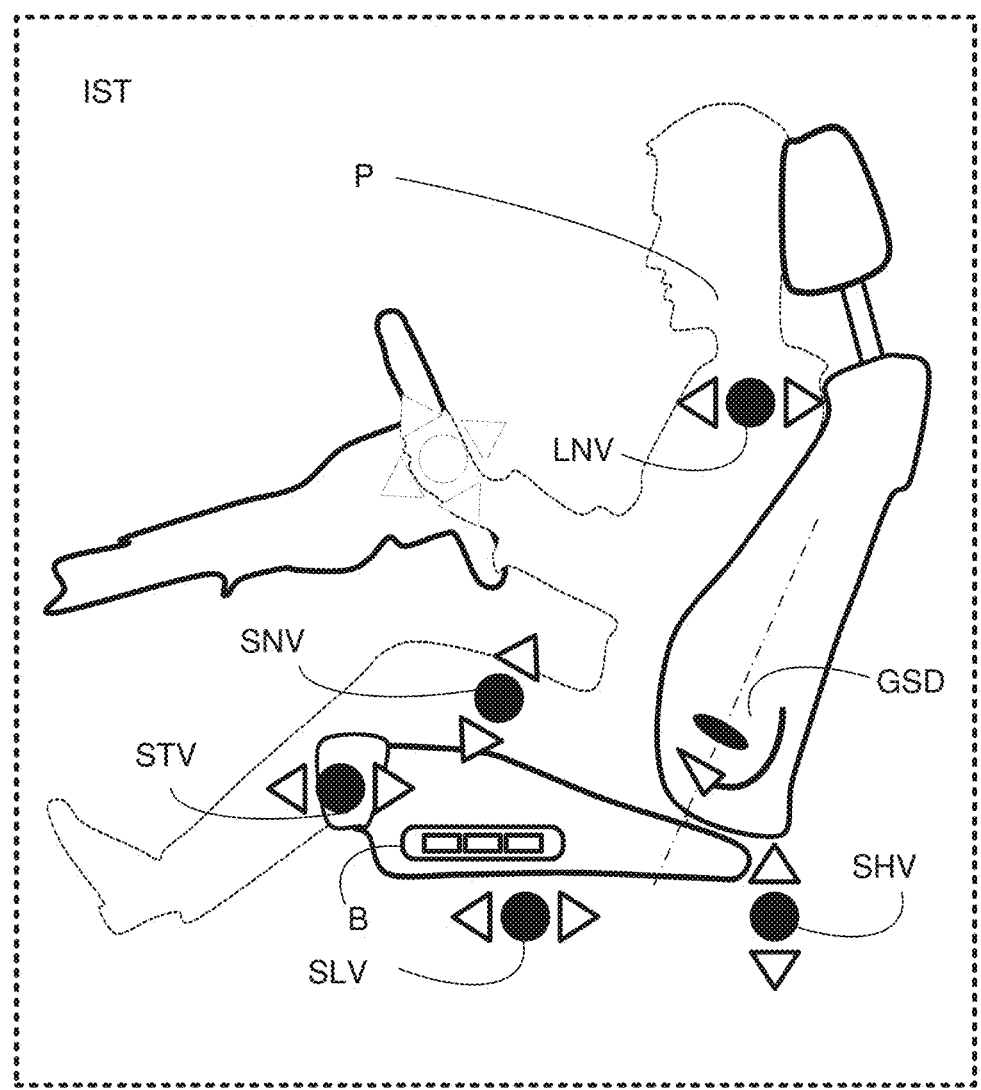
FIG. 2 shows a possible input unit for vehicle occupant data and the interfaces of the electronic control unit of an adjustment device according to the embodiment of the invention.
Figure 2:
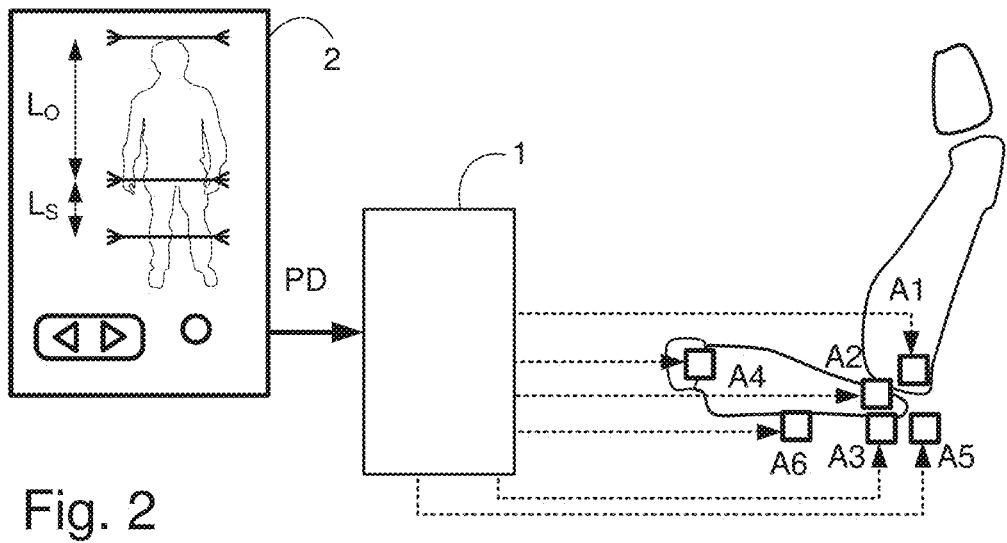

A mobile terminal 2 is shown as a data carrier in FIG. 2. After recording of a photo by the mobile terminal 2 and the display of the photo on the touchscreen of the mobile terminal, at least the input of the torso length $L_O$ and the thigh length $L_S$ is requested, for example in that a (sliding) bar can be set to the desired position as a marking sign using a finger. By touching the right arrow "forward", the input of the position of other body parts for the setting of other components can be enabled.

After renewed actuation of the "forward" arrow, after the operator has considered all displayed bars to be correct, finally the input of the body size and preferably also the name are requested. By way of the input of the name, various profiles can be stored in the data carrier and/or in the control unit 1 so they are retrievable again.

Depending on the vehicle occupant data PD thus transferred from the terminal 2 to the control unit 1, in the control unit 1 and/or in the analysis unit QSA, in which the vehicle occupant geometry data FIG are also provided, the silhouette FP consisting of seat geometry data FIG and of the data PD of the person P seated thereon, and also, depending thereon, the required adjustment space for the most efficient kinematic course is determined.

In FIGS. 1 and 2, a possible association of the individual adjustments with the various actuators is illustrated solely for the sake of completeness.

FIG. 3 shows a silhouette illustration of an actual setting IST, an intermediate setting, and a target setting SOLL. The silhouette determination is, as already described above, again the foundation for the determination of the adjustment space requirement and/or the kinematic course on the basis of the further vehicle interior geometry FIG, for example the fixed space boundaries and/or the other seats.

FIG. 3 proceeds in a first case from a fixed other seat and in a second case from an adjustable other seat.

The efficiency-oriented adjustment space requirement and/or the most efficient kinematic course can be in the first case a backrest adjustment SLV together with a seat inclination adjustment SNV, and therefore (as shown on the left and right in the middle), the seat surface SF is reduced to SF' and backrest surface LF is reduced to LF', to also reduce the adjustment space requirement.

However, as in the second case, if only a seat length adjustment SLV of the interfering neighboring seat is required, to be able to carry out an entire seat rotation GSD of the one seat thereafter, according to the invention, this would possibly be the more efficiency-oriented adjustment space requirement and the more efficient kinematic course.

The vehicle interior geometry FIG can be stored, for example in a model-dependent manner in a characteristic map programming at the tape end in the control unit 1 or measured via vehicle interior cameras and provided as measured data to the control unit 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustment device for automatic seat position change in a vehicle from an actual setting into a predefinable target setting, comprising:
   an electronic control unit for automatically setting at least one actuator for adjusting at least one seat-position-dependent adjustable vehicle component depending on detected vehicle occupant data, wherein
      the electronic control unit comprises an analysis unit for determining an efficiency-oriented adjustment space requirement for the adjustment of the actual setting into the target setting depending on the vehicle occupant data and a vehicle interior geometry; and
      if an entire seat rotation is not presently possible, then the entire seat rotation is made subsequently possible via:
         a first preferred vehicle component adjustment that is a backrest adjustment, and/or
         a second preferred vehicle component adjustment that is a seat inclination adjustment.

2. The adjustment device as claimed in claim 1, wherein the analysis unit for determining the efficiency-oriented adjustment space requirement is designed such that an effective kinematic course of the seat-position-dependent adjustable vehicle component with respect to adjustment duration and/or energy consumption for the adjustment of the actual setting into the target setting is determinable thereby depending on the vehicle occupant data and the vehicle interior geometry.

3. The adjustment device as claimed in claim 1, wherein the analysis unit is designed such that a silhouette of a seat occupied by a vehicle occupant is computable with respect to the vehicle occupant data and seat-position-dependent adjustable vehicle components.

4. The adjustment device as claimed in claim 1, wherein the analysis unit contains a priority rule with respect to a plurality of the actuators.

5. The adjustment device as claimed in claim 1, wherein a first preferred adjustable vehicle component is the entire seat, by which an entire seat rotation is executable for the adjustment from the actual setting into the target setting.

6. The adjustment device as claimed in claim 1, wherein a seat depth adjustment, a seat height adjustment, a seat length adjustment, and/or a seat transverse adjustment is/are executable.

7. The adjustment device as claimed in claim 1, wherein at most two of the actuators are adjustable simultaneously.

8. The adjustment device as claimed in claim 1, wherein the efficiency-oriented adjustment space requirement also corresponds to a minimal adjustment space requirement.

9. The adjustment device as claimed in claim 1, wherein the vehicle is an autonomously driving vehicle comprising at least one rotatable entire seat.

10. A method of operating an adjustment device for automatic seat position change in a vehicle from an actual setting into a predefinable target setting, the method comprising the steps of:
   automatically setting at least one actuator that adjusts at least one seat-position-dependent adjustable vehicle component wherein
      the automatic setting is carried out by:
         determining an efficiency-oriented adjustment space requirement for adjustment of the actual setting into the target setting, wherein the determining of the efficiency-oriented adjustment space requirement is dependent on vehicle occupant data and a vehicle interior geometry; and if an entire seat rotation is not presently possible, then the entire seat rotation is made subsequently possible via:

a first preferred vehicle component adjustment that is a backrest adjustment, and/or a second preferred vehicle component adjustment that is a seat inclination adjustment.

11. The method as claimed in claim 10, wherein the determining of the efficiency-oriented adjustment space requirement is carried out by:

determining an effective kinematic course of the seat-position-dependent adjustable vehicle component with respect to one or more of an adjustment duration or an energy consumption for the adjustment of the actual setting into the target setting.

12. The method as claimed in claim 10, wherein
the determining of the efficiency-oriented adjustment space requirement includes the step of computing a silhouette of a seat occupied by a vehicle occupant using the vehicle occupant data.

13. The adjustment device as claimed in claim 1, wherein the analysis unit determines the efficiency-oriented adjustment space requirement without using a vehicle-internal sensor.

14. The adjustment device as claimed in claim 12, wherein the vehicle occupant data comprises at least one of an anthropometrical measurement, an anthropometrical proportion, and an anthropometrical classification.

15. The adjustment device as claimed in claim 1, wherein the automatically setting selecting the at least one actuator further depends on the adjustment duration and/or energy consumption of the at least one actuator.

16. The adjustment device as claimed in claim 15, wherein the at least one actuator is configured to perform an adjustment to a neighboring seat of the vehicle.

* * * * *